United States Patent [19]
Ishikawa et al.

[11] Patent Number: 5,582,051
[45] Date of Patent: Dec. 10, 1996

[54] AUTOMATIC FLAW-CUTTING METHOD AND APPARATUS FOR WIRE-SHAPED METAL

[75] Inventors: Yoshiteru Ishikawa; Toshihiro Kidani, both of Shin Minato, Japan

[73] Assignee: Nippon Koshuha Steel Co., Ltd., Tokyo, Japan

[21] Appl. No.: 306,200

[22] Filed: Sep. 14, 1994

[30] Foreign Application Priority Data

Mar. 3, 1994 [JP] Japan .................................. 6-060197
Mar. 3, 1994 [JP] Japan .................................. 6-060198

[51] Int. Cl.$^6$ ............................................ B21C 1/12
[52] U.S. Cl. .................. 72/3; 72/275; 72/289; 72/18.8
[58] Field of Search ............................. 72/275, 280, 289, 72/3, 10; 409/298

[56] References Cited

U.S. PATENT DOCUMENTS

| | | | |
|---|---|---|---|
| 2,029,206 | 1/1936 | Williams | 72/275 |
| 3,373,584 | 3/1968 | Rundt | 72/10 |
| 4,291,600 | 9/1981 | Kawaguchi | 82/20 |
| 4,545,227 | 10/1985 | Sudoh | 72/12 |
| 4,799,300 | 1/1989 | Phillips | 72/275 |
| 4,808,926 | 2/1989 | Graham | 72/10 |
| 4,917,285 | 4/1990 | Shosie | 72/275 |
| 5,016,475 | 5/1991 | Aburatani | 73/644 |

FOREIGN PATENT DOCUMENTS

| | | | |
|---|---|---|---|
| 2422816 | 5/1974 | Germany | 72/275 |
| 110419 | 6/1984 | Japan | 72/275 |
| 59-50453 | 8/1984 | Japan . | |
| 56412 | 4/1985 | Japan | 72/3 |
| 60-35208 | 8/1985 | Japan . | |
| 234614 | 10/1987 | Japan | 72/275 |
| 170513 | 7/1989 | Japan | 72/3 |

*Primary Examiner*—Daniel C. Crane

[57] ABSTRACT

This flaw-removal device prevents overlooking of flaws in the automatic flaw-cutting process by rectifying the twist of a wire-shaped metal drawn from a cannon-shaped wire supply stand, further promoting efficiency in removing remaining flaws by applying the automatic flaw-cutting process and removing the uncut flaws by hand. In this invention, a twist-rectifying drum 3 is installed in front of a flaw-detecting device 4. It then becomes possible to rectify the twisting of the wire-shaped metal by winding the wire-shaped metal installed on a cannon-shaped wire supply stand around the twist-rectifying drum in a length longer than one turn of the coiled wire-shaped metal so that the wire-shaped metal is freely mounted on the drum. It also becomes possible to remove an uncut flaw by hand by installing a flaw-check and removal site 10 having a specified span between drawing dies 8 and a wire-drawing drum 9, and by stopping the portion of the wire-shaped metal having uncut flaws at the site 10.

2 Claims, 3 Drawing Sheets

AUTOMATIC FLAW-CUTTING METHOD AND APPARATUS FOR WIRE-SHAPED METAL

BACKGROUND OF THE INVENTION

The present invention relates to an automatic flaw-cutting method and apparatus for wire-shaped metal which automatically and mechanically cuts flaws detected on the surface of coiled wire-shaped metals.

This invention also relates to a flaw-removal method and apparatus for wire-shaped metals having a deeper flaw than specified cutting allowance and more than two flaws located on the same sectional surface of wire-shaped metal.

Up to the present, the following methods for removing the flaws existing on the surface of wire-shaped metals such as bearing steel and stainless steel have been used:

(a) Peeling all surfaces of wire-shaped metals by applying chipping dies;

(b) Peeling all surfaces of wire-shaped metals by using a centerless peeling machine;

(c) Grinding the flawed portions by using a hand grinder after visually detecting the flaws;

(d) Grinding marked portions after detecting the flawed portions along the entire length of a wire-shaped metal by an automatic flaw-detecting device and marking the flawed portions with paint.

However, there are drawbacks which increase costs in methods like (a) and (b) above, such as yield rate dropping and early wearing of the peeling tool. And in methods (c) or (d), although they remarkably improve the yield rate of the product by peeling only the portions to be removed, they require unbinding of the wire-shaped metal, and visual detection of the flaws along the entire length and all peripheries, or visual detection of the paint-marked portion around the periphery. Consequently, these methods are difficult to work, inefficient and incur remarkably high labor costs.

The present invention was developed in consideration of the above-mentioned drawbacks, and its first object is to reduce labor costs, to increase produce yield rate, to shorten processing time, and to reduce production costs by automatically cutting only the flawed portions of a wire-shaped metal.

However, in order to remove harmful flaws entirely, the following problems must be resolved.

Namely, in a conventional automatic flaw cutting apparatus, a coiled wire-shaped metal is supported on a horizontal cannon-shaped wire supply stand, which wire-shaped metal is then supplied to an automatic flaw-cutting line.

By applying this method, the coil of the wire-shaped metal installed on the cannon-shaped supply stand is able to be drawn horizontally without rotation, and supplied into the flaw-cutting line.

Accordingly, it becomes possible to supply a new coil during a non-stop flaw-cutting process by installing another alternative coil supply stand in parallel with the working stand, by welding the end tip of the new coil supported on the alternative stand to the tip of the end turn of the running coiled wire-shaped metal while the flaw-removing process is performed.

However, when the cannon-shaped supply stand is used, since a wire-shaped metal is installed on the stand and placed horizontally, and introduced into the flaw-cutting line without rotation, the wire-shaped metal is twisted along its axis and the degree of twisting becomes indefinite. Due to this twisting, the peripheral positions of flaws detected by the flaw-detecting device do not coincide with the tooling position prepared in the flaw-cutting device. As a result, flawless portions might be cut while flawed portions remain.

In considering the above drawbacks, the second object of the present invention is to provide an automatic flaw-cutting method and apparatus enabling the peripheral position of the detected flaw to coincide with the tooling position prepared in the flaw-cutting device, by placing a twist-rectifying drum in front of the flaw-detecting device, and by winding the wire-shaped metal drawn from the cannon-shaped supply stand around the rectifying drum in a length longer than one turn of the coiled wire-shaped metal.

Further, the cutting allowance of the flaw-cutting device is specified so as to cut as much as the predetermined depth on the same periphery of the wire-shaped metal by using only one bite, in order to prevent the failure of the bite and disconnection of the wire-shaped metal during the flaw-cutting operation.

Accordingly, there is the possibility of leaving a flaw remaining if a flaw deeper than the specified cutting allowance exists. Further, if more than two flaws exist on the same peripheries of the wire-shaped metal, an uncut flaw will remain.

In consideration of the above-mentioned drawbacks, the third object of the present invention is to provide an automatic flaw-cutting method and apparatus enabling flaw cutting by hand when a non-cut flaw is detected, by installing a flaw-check and flaw-cutting site between a drawing die and a winding drum individually composing a wire-drawing apparatus, and by automatically stopping the wire-shaped metal on the way to the site when the non-cut flaw is found, and by removing the flaw by hand.

SUMMARY OF THE INVENTION

In order to attain the above objects, in a flaw-removal method comprising, detecting existence and location of the circumferential and longitudinal flaw on the surface of wire-shaped metal by applying a flaw-detecting device; transmitting flaw informations detected by flaw-detecting device to a distance computing device and to a flaw-cutting device; detecting running speed of said wire-shaped metal by applying a running speed detecting device; computing the distance between said detected flaw position and said flaw-cutting device by applying a running speed information received from said running speed detecting device or the distance-computing device; activating the flaw-cutting device by applying a distance information of the wire-shaped metal obtained from the distance-computing device; and cutting said detected flaw by applying the flaw-cutting device, the method according to this invention is characterized by winding the wire-shaped metal drawn from a cannon-shaped wire supply stand around a twist rectifying drum located in front of the flaw-detecting device as much as the length longer than one turn of said coiled wire-shaped metal as being wound.

Also, in a flaw-removal apparatus comprising a flaw-detecting device which finds the existence and location of circumferential and longitudinal flaws on the surface of a wire-shaped metal, a device which detects the running speed of the wire-shaped metal or a distance-computing device, a flaw-cutting device which cuts detected flaws by applying flaw information detected by said flaw-detecting device and wire-running speed information transmitted from said running speed-detecting device or distance ran information obtained from the distance-computing device, the apparatus according to the present invention is characterized by comprising a cannon-shaped wire supply stand and a twist-rectifying drum located in front of the flaw-detecting device, the rectifying drum being wound with the wire-shaped metal drawn from the supply stand around the drum as much as the length longer than one turn of the coiled wire-shaped metal.

Further, in a flaw-removal method comprising the detection of the existence and location of circumferential and longitudinal flaws on the surface of a wire-shaped metal by applying a flaw-detecting device, transmitting flaw information detected by the flaw-detecting device to a distance-computing device and to a flaw-cutting device, detecting running speed of the wire-shaped metal by applying a running speed-detecting device, computing the distance between the detected flaw position and the flaw-cutting device by applying a running speed information received from the running speed detecting device or the distance-computing device, activating the flaw-cutting device by applying a distance information of the wire-shaped metal obtained from the distance-computing device, and cutting the detected flaw by applying the flaw-cutting device, the method according to the present invention is characterized by comprising the installation of a flaw-check and flaw-removal site having a specified span between a pair of drawing die and a winding drum each composing the wire-drawing apparatus, automatically stopping the wire-shaped metal on the way to the site when the flaw-detecting device detects a deep flaw having a depth greater than a specified cutting allowance and more than two flaws on the same periphery of the wire-shaped metal by applying the information and removing the detected flaws by hand.

Furthermore, in a flaw-removal apparatus comprising a flaw-detecting device which finds the existence and location of circumferential and longitudinal flaws on the surface of a wire-shaped metal, a device which detects the running speed of the wire-shaped metal, a distance computing device alternating with the running speed-detecting device, a flaw-cutting device which removes detected flaws by applying flaw information transmitted from the flaw-detecting device and from the running speed-detecting device and wire-running speed information received from the running speed-detecting device or from the distance ran information obtained from the distance-computing device, the flaw-removal apparatus according to the present invention is characterized by comprising a cannon-shaped wire supply stand, a flaw-check and flaw-removal site having a specified span installed between a pair of drawing die and a winding drum composing the wire-drawing apparatus, and the site automatically stopping the wire-shaped metal on the way to the site, when the flaw-detecting device detects a deep flaw having a greater depth than the specified cutting allowance and more than two flaws on the same periphery of the wire-shaped metal by applying the information.

Although the wire-shaped metal drawn from the cannon-shaped wire supply stand is twisted in every coiling turn, the twisting is rectified by winding the wire-shaped metal around the rectifying drum in a length longer than one turn of the coiled wire-shaped metal.

Also, if flaws deeper than the cutting allowance and more than two flaws on the same periphery are detected, the location of the above-mentioned flaws are automatically stopped between the drawing dies and the winding drum.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Embodiments according to the present invention are described in detail with reference to the drawings as follows.

Figure 1:
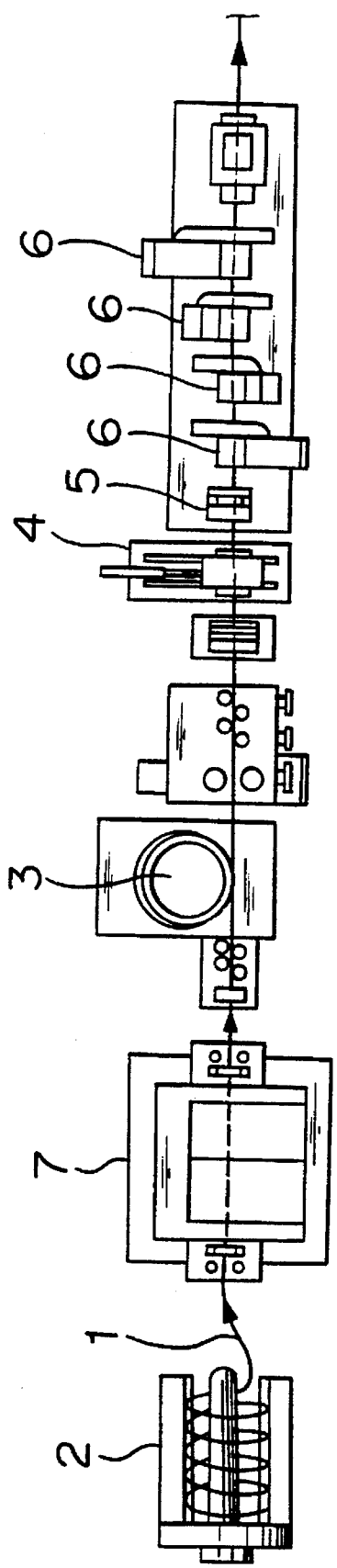
FIG. 1 is a plan view showing one embodiment according to the present invention.
Figure 2:
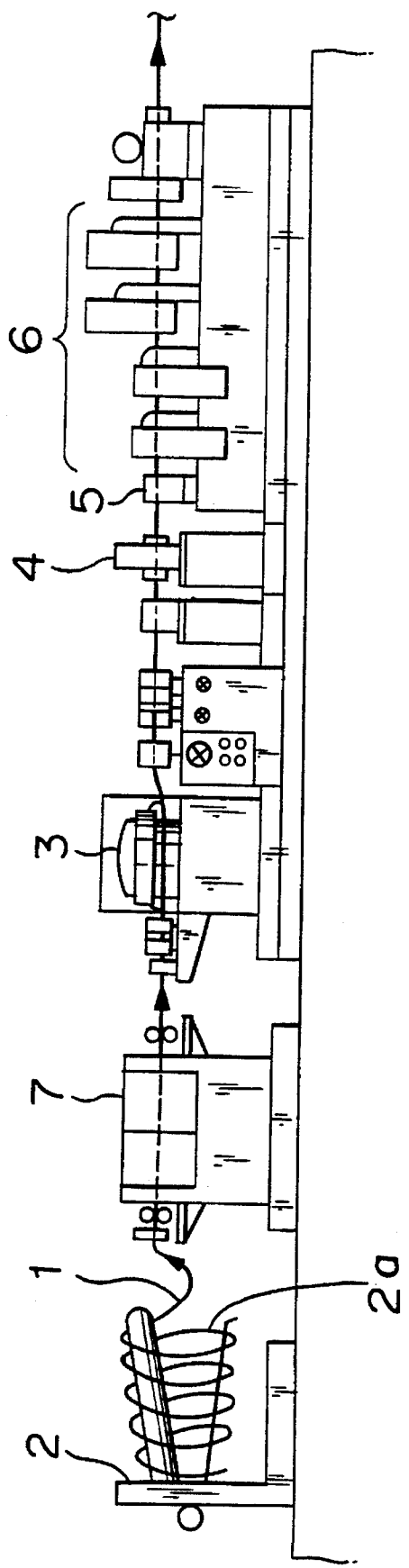
FIG. 2 is an elevational view showing the embodiment shown in FIG. 1.

FIG. 1 is a plan view showing one embodiment according to the present invention, and FIG. 2 is an elevational view thereof.

In FIG. 1 and FIG. 2, numeral 1 is a wire-shaped metal, numeral 2 is a cannon-shaped wire supply stand, numeral 3 is a winding drum for rectifying the twisted material, numeral 4 is a flaw-detecting device, numeral 5 is a distance-computing device, and numeral 6 is a flaw-cutting device. A wire-drawing device and a winding device placed in back of the flaw-cutting device are not shown in these figures.

As shown in FIG. 1 and FIG. 2, the wire-shaped metal 1 drawn from the cannon-shaped wire stand 2 and straightened, is twisted against wire axial direction towards the left or right direction per one turn of the wire-shaped metal in accordance with the wound direction of wire metal in the position 2a of the wire-shaped metal. In order to rectify this twisting, it is necessary to wind the wire around the twist-rectifying drum 3 as much as one turn further to let the wire-shaped metal be freely wound without contacting the rectifying drum 3.

In FIGS. 1 and 2, numeral 7 is a drawing device for pulling the wire-shaped metal 1 out of the cannon-shaped wire supply stand 2, and the wire-shaped metal 1 is held in the state keeping some distance away from the drum surface by pulling the wire-shaped metal between drawing dies of the drawing device (not shown in FIG. 1 and FIG. 2) and the drawing device 7, each placed on both sides of the twist-rectifying drum 3.

Further longitudinal and circumferential directions of the flaws in the wire-shaped metal drawn from the cannon-shaped wire supply stand 2 are detected by the flaw-detecting device 4, then the detected flaws are removed by the flaw-cutting device 6, usually comprising a cutting bite.

In other words, when the flaws are detected by the flaw-detecting device 4, the device transmits the signal to the distance-computing device 5, then the computing device transmits the working signal to the flaw-cutting device 6, and when the wire-shaped metal runs the distance from the flat-detecting device 4 to the flaw-cutting device 6, the activated flaw-cutting device removes the flaws.

It may also be possible to activate the flaw-cutting device by converting the distance computing device 5 to a running speed-detecting device and combining running speed information transmitted from the running speed-detecting device with the flaw information transmitted from the flaw-detecting device 4.

In this case, as the twisting of the wire-shaped metal 1 is rectified by the twist-rectifying drum 3, the circumferential position of the flaw detected by the flaw-detecting device 4 usually matches with the circumferential working position of the flaw-cutting device 6, and it becomes impossible to cut the flawless portion of the wire-shaped metal, perfectly solving the conventional problem of leaving flaws.

Figure 3:
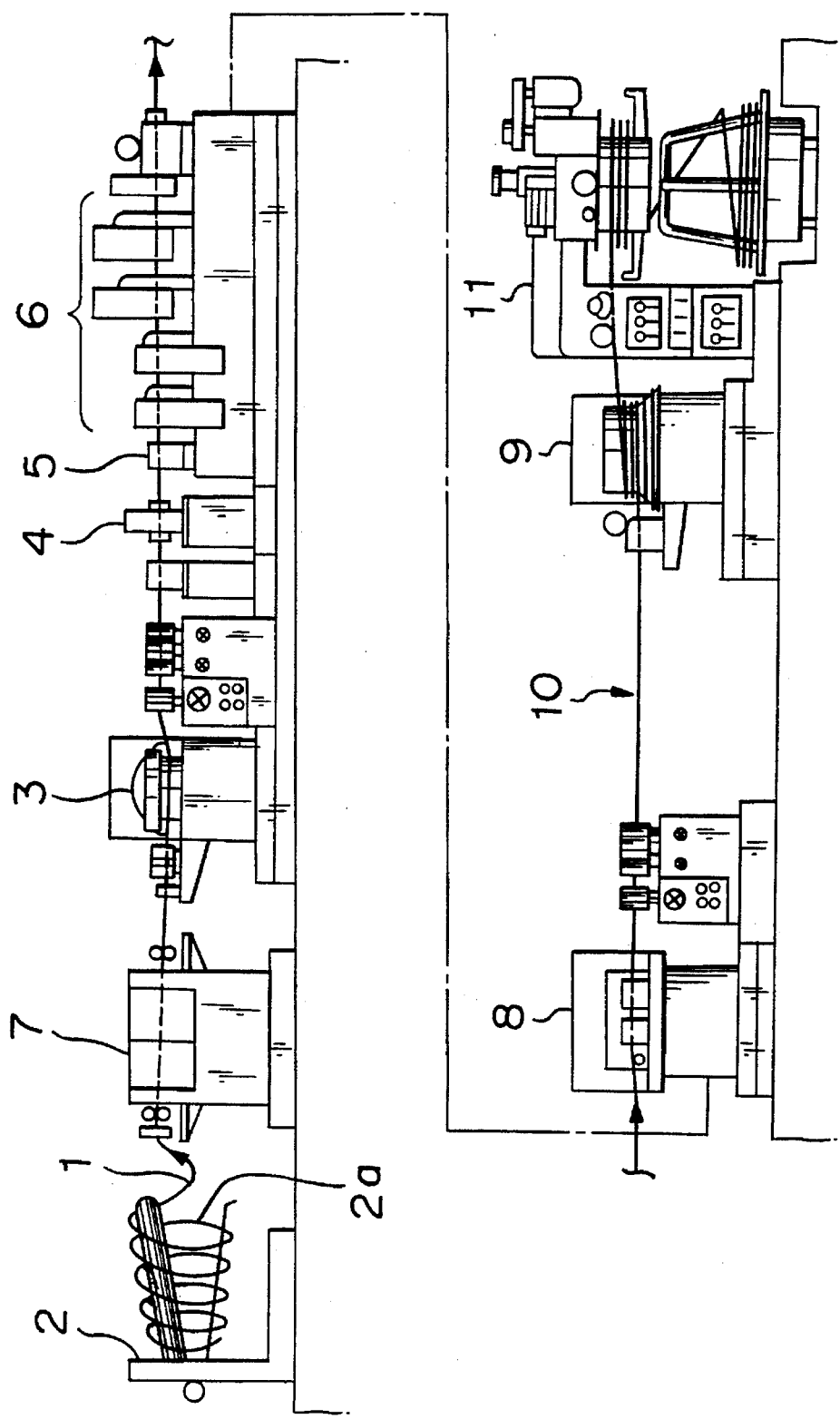
FIG. 3 is an elevational view showing another embodiment according to the present invention.

FIG. 3 is an elevational view of another embodiment according to the present invention.

In FIG. 3, numeral 1 is the wire-shaped metal, numeral 2 is a cannon-shaped wire supply stand, numeral 3 is a twist-rectifying drum, numeral 4 is a flaw-detecting device, numeral 5 is a distance-computing device, numeral 6 is a flaw-cutting device (composed with a cutting bite), numerals 8 and 9 are respectively dies and a drawing drum composing the wire-drawing machine, and numeral 11 is a winding device.

In the layout shown in FIG. 3, when the wire-shaped metal 1 is drawn from the cannon-shaped wire supply stand 2 and straightened, the wire-shaped metal 1 is twisted. In order to rectify this twisting, the wire-shaped metal is wound around the twist-rectifying drum as much as one turn, and the wound wire-shaped metal is kept around the rectifying drum without contacting the surface of the drum (namely, in the idle running condition).

In this embodiment, the horizontal cannon-shaped wire supply stand and the twist-rectifying drum 3 are applied, but it may be possible to draw the wire-shaped metal without twisting by winding the wire coil 2a on a rotatable vertical-type drum. Meanwhile, in this alternative case, as the wire coil 2a revolves together with the vertical drum, and it is impossible to weld an additional coil to the rotating coil, then when the drawing of the coil ends it is necessary to stop this operation and exchange with the new coil.

The wire-shaped metal 1 has its twisting rectified by the twist-rectifying drum 3, and the existence and location of surface flaws are detected by the flaw-detecting device 4. The flaw-cutting device 6 then cuts and removes the detected flaws by applying the information concerning the existence of flaws and the information that the position of the detected flaw has been reached to the flaw-cutting device, transmitted from the distance-computing device 4.

In other words, in detecting the flaws with the flaw-detecting device, the detecting device transmits a detecting signal to the distance-computing device 5, and then the computing device 5 transmits the working signal to the flaw-cutting device 6, when the wire-shaped metal 1 runs the distance between the flaw-detecting device 4 and the flaw-cutting device 6, it finally activates the cutting device 6 to cut the detected flaws.

However, it may be possible to activate the flaw-cutting device 6 by applying the running speed information derived from the running speed detecting device and the flaw information supplied from the flaw-detecting device 4, after converting the above-mentioned distance computing device 5 to the running speed detecting device.

In the above-mentioned automatic flaw-cutting line, in order to avoid the bite tearing and the breaking of the running wire-shaped metal, the flaw-cutting device is set to cut as much as a specified constant depth by using only one bite on the same section of the wire-shaped metal.

Accordingly, if there are flaws that are deeper than the specified cutting depth on the surface of the wire-shaped metal, there are necessarily traces left remaining. Also if more than two flaws exist on the same periphery of the wire-shaped metal, the non-cut flaw remains as it is.

Although the flaw detected by the flaw-detecting device 4 is surely removed by the flaw-cutting device, if there is a deeper flaw than the specified cutting allowance, or a plural of flaws, the wire-shaped metal 1 is stopped at the flaw-check and removal site 10 located between the drawing dies 8 and the wire-drawing drum 9 after the detected flaw is cut, and at this site, flaw-check and flaw-removal are performed, making flawless wire-shaped metal.

If a flaw deeper than the specified cutting depth, or a plurality of flaws on the same sectional surface of the wire-shaped metal exist, the flaw-detecting device 4 transmits the signal which informs that there are such flaws, and the distance-computing device 5 sends stop signals to winding device 11 and the wire-drawing device 8 when the wire-shaped metal runs as much as the distance between the flaw-detecting device 4 and the flaw-check, flaw-removal site 10, for stopping the wire-shaped metal 1 at the site 10.

After the wire-shaped metal 1 is stopped, the remaining or unremoved flaws are detected visually or by a magnetic powder flaw detecting device, then removed by a hand grinder or the like.

According to the present invention as described above in detail, it is possible to attain the following desired effects.

(1) By automatically removing only flawed portions on the wire-shaped metal, it becomes possible to decrease labor costs, to increase product yield rate, to obtain high productivity owing to a shortened cutting time, and to reduce general production costs.

(2) As the wire-shaped metal passes through the flaw-detecting device with the twisting of the wire-shaped metal perfectly rectified, it is possible to obtain a wire-shaped metal having no harmful flaws by surely cutting the flaw portion with the flaw-cutting device.

(3) As the remaining flaws left by the automatic flaw-cutting device are automatically stopped at the flaw-check position located between the drawing dies and the wire-winding drum, and the flaw-removal operations are able to be performed by hand, it then becomes possible to effectively manufacture a flawless wire-shaped metal.

What is claimed is:

1. An automatic flaw-removal method comprising the steps of detecting the existence and location of circumferential and longitudinal flaws on the surface of wire-shaped metal with a flaw-detecting device;

providing a flaw cutting device to remove flaws from the surface of said wire shaped metal;

transmitting flaw information detected by said flaw-cutting device;

detecting the running speed of said wire-shaped metal with a running-speed detecting device;

computing the distance using a distance-computing device between said detected flaw position and said flaw-cutting device from at least one of said running-speed detecting device based on the running speed information received therefrom and said distance computing device;

activating said flaw-cutting device by applying a distance information of the wire-shaped metal obtained from said at least one of said running-speed detecting device and distance-computing device;

cutting said detected flaw with said flaw-cutting device;

providing a drawing die for reducing the diameter of said wire-shaped metal and a winding drum for pulling said metal through said drawing die;

installing between said drawing die and said winding drum a flaw-check point and removal site;

stopping said wire-shaped metal on the way to said flaw-check point and flaw removal site on the same working line, when said flaw-detecting device detects a deep flaw having a greater depth than specified cutting allowance or not less than two flaws on the same periphery of said wire-shaped metal by applying said information; and removing said detected flaws by hand.

2. An automatic flaw-removal apparatus provided with a flaw-detecting device which finds the existence and location of circumferential and longitudinal flaws on the surface of a wire-shaped metal, comprising

- detecting means for detecting the running speed of said wire-shaped metal;
- distance-computing means being alternatively used with said detecting means;
- flaw-cutting means which removes the detected flaw on a basis of flaw information transmitted from said detecting means and wire-running speed information received from said detecting means or distance ran information obtained from said distance-computing means;
- drawing dies for reducing the diameter of said wire-shaped metal and a winding drum for pulling said metal through said drawing dies;
- a flaw-check and flaw-removal site having a specified span installed between said drawing dies and said winding drum; and means for automatically stopping said wire-shaped metal on the way to said site, when said flaw-detecting means detects deep flaws having a flaw depth deeper than specified cutting allowance or not less than two flaws on the same periphery of said wire-shaped metal.

* * * * *